S. HULL.
Mower.

No. 22,077.

Patented Nov. 16, 1858.

UNITED STATES PATENT OFFICE.

STEPHEN HULL, OF POUGHKEEPSIE, NEW YORK.

IMPROVEMENT IN HARVESTERS.

Specification forming part of Letters Patent No. 22,077, dated November 16, 1858.

*To all whom it may concern:*

Be it known that I, STEPHEN HULL, of Poughkeepsie, in the county of Dutchess, and in the State of New York, have invented a new and useful Improvement in Harvesting-Machines; and I do hereby declare that the following is a full and exact description thereof, reference being had to the accompanying drawings, and to the letters of reference marked thereon.

The nature of my invention consists in having the inside shoe of harvesting-machines, to which the finger-bar is fastened, constructed with three bearings—one at each end and the other near the middle—on a line, or nearly so, with each other, and the shoe made long enough to admit of being gradually turned up from near the middle toward each end, so that the bearings will be high enough from the ground to allow the shoe to pass freely over the cut grass and other obstructions, whether the finger-bar is down on the ground for cutting grass or turned up, moving from one place to another on a small wheel, that is made to run on the ground inside of the shoe and allowed to remain in the same position by the middle bearing on the shoe being allowed to turn in one end of the bar or frame to which the small wheel and lever is attached, so that the shoe and finger-bar are made to rest on this wheel, whether in cutting grass or going from one place to another; and the finger-bar, though it may be allowed to turn over against the driving-wheel, may be prevented from rising or falling too much, so as to prevent the connecting-rod from working the cutters, by slots or notches made in the shoe, in which stop-pins or other catches are made to operate as may be wished.

To enable others skilled in the art to make and use my invention, I will proceed to describe its construction and operation, reference being had to the annexed drawings, and to the letters of reference marked thereon, making a part of this specification, in which—

Figure 1:
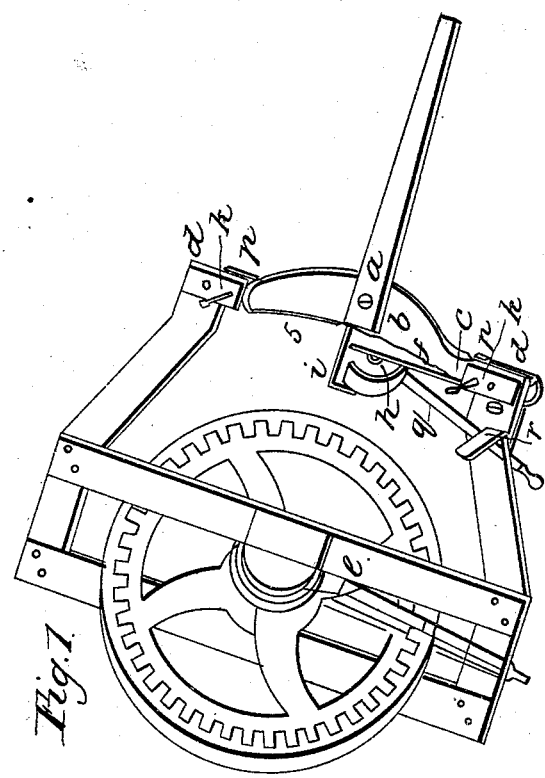
Figure 3:
Figure 2:
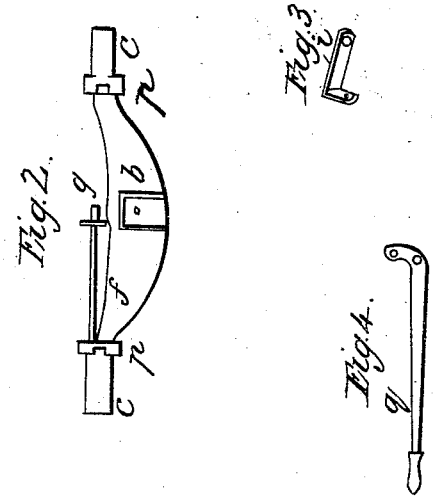
Figure 4:
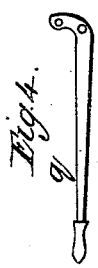

Figure 1 is a perspective view of my invention fastened to a harvesting-machine. Fig. 2 is a side view of the inside shoe with its three bearings. Fig. 3 is a view of the frame or bar $i$, that turns on the middle bearing and supports the adjustable wheel $h$. Fig. 4 is a view of the lever to the wheel $h$.

$a$ is the finger-bar.

$b$ is the inside shoe, to which the finger-bar is fastened.

$c\ c$ are circular bearings at each end of the shoe, which turn in boxes or holes $d\ d$, fastened to the end bars or bar of the main frame, to allow the finger-bar and cutters to rise and fall as they pass over uneven ground, and to be turned up when necessary to go from one place to another.

$f$ is an upright flange on the shoe $b$, extending forward to near the middle, or where the finger-bar is fastened, for the purpose of forming a bearing, $g$, on a line, or nearly so, with the bearings $c\ c$ for the bar or frame $i$ to turn on, which supports the lever $l$ and wheel $h$, so as to allow the finger-bar to oscillate or be turned up without changing the position of the wheel $h$, on which the finger-bar and shoe $b$ rest.

$k\ k$ are bolts or set-pins, which pass through the flanges $o\ o$ into slots or notches made in the shoe or flanges to keep the finger-bar from rising or falling too much, and at the same time allow it to rise and fall sufficiently to work well on uneven ground. The bolts $k\ k$ and the pin $r$ are to be taken out when the finger-bar is to be turned up, and then put in again when the finger-bar is turned up to its proper place to keep it from falling back while going from one place to another.

$r$ is a small pin or bolt that holds the bar or frame $i$ from turning while the machine is in motion by passing through the bar $i$ and the flange close to the bearing $g$.

Operation and use: I make my inside shoe longer than is common, so that it may be turned up gradually from near the middle or the under side toward each end, for the purpose of having the bearings $c\ c$, where they are fastened to the main frame, high enough from the ground to pass freely over cut grass and other obstacles without any obstruction, and also to cause the under side of the shoe $b$, by being bent down to the ground, to be raised when the finger-bar is turned up on the small wheel $h$ high enough to pass over stones and other obstacles while going from one place to another. There is also another difficulty in using jointed finger-bars as heretofore made. On very uneven ground they are necessarily very liable to rise and fall so much at times as to put the knife-rod and cutters so much out of line with the connecting-rod as to render it impossible to work them. Consequently the machine is broken or stopped suddenly. To prevent this I make slots, holes, or notches in the shoe $b$, or flanges near the bearings $c\ c$, wide enough to receive catches or bolts and give the finger-bar sufficient play up and down while working on uneven ground, without allowing it too much, so as to prevent the connecting-rod from working the knife-rod and cutters.

I do not claim connecting the finger-bar to the machine by a hinge-joint; nor do I claim connecting the finger-bar to the machine by the double-rule joint, nor with the double-jointed coupling; but What I do claim as my invention, and desire to secure by Letters Patent, is—

1. Connecting the inside shoe, $b$, to which the finger-bar is fastened, directly to the main frame, or to one or both the end bars of the main frame, by means of circular bearings at each end of the shoe, without any coupling-piece, in combination with a small wheel hinged to the inside shoe, substantially as herein represented, and for the purposes set forth.

2. The notches, holes, or slots in the shoe and flanges near the bearings or joints on which the shoe turns, in connection with the movable catches or bolts that work in them to keep the finger-bar in its proper place or from rising or falling too much over uneven ground, in combination with a jointed shoe constructed substantially as herein represented, and for the purposes set forth.

3. I do not claim simply attaching a wheel of any kind to the inside shoe; but I do claim the arrangement of the small wheel $h$ with the jointed frame or bar $i$, hinged to the inside shoe, by which the wheel is allowed to remain in the same position when the finger-bar is turned up to go from place to place as it is when the machine is cutting grass and the finger-bar rising and falling over uneven ground.

STEPHEN HULL.

Witnesses:
 GEO. R. BROWN,
 HENRY HAZENBUHLER,
 ADOLPH M. BRUSH.